(12) United States Patent
Hudson et al.

(10) Patent No.: US 10,352,399 B2
(45) Date of Patent: Jul. 16, 2019

(54) ACTUATOR ASSEMBLY

(71) Applicant: Lear Corporation, Southfield, MI (US)

(72) Inventors: Curtis Hudson, Southfield, MI (US); Mark R. Keyser, Lake Orion, MI (US); Andrzej Dlugokecki, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/141,172

(22) Filed: Apr. 28, 2016

(65) Prior Publication Data

US 2017/0314643 A1 Nov. 2, 2017

(51) Int. Cl.
| | |
|---|---|
| *F16H 1/20* | (2006.01) |
| *F16H 19/06* | (2006.01) |
| *H02K 7/116* | (2006.01) |
| *F16H 33/02* | (2006.01) |
| *F16H 37/12* | (2006.01) |
| *F16H 57/021* | (2012.01) |
| *F16H 55/22* | (2006.01) |
| *F16H 57/039* | (2012.01) |
| *F16H 57/02* | (2012.01) |

(52) U.S. Cl.
CPC .......... *F16H 1/203* (2013.01); *F16H 19/0645* (2013.01); *F16H 33/02* (2013.01); *F16H 37/12* (2013.01); *H02K 7/1166* (2013.01); *F16H 19/06* (2013.01); *F16H 55/22* (2013.01); *F16H 57/021* (2013.01); *F16H 57/039* (2013.01); *F16H 2057/0213* (2013.01); *F16H 2057/02034* (2013.01)

(58) Field of Classification Search
CPC .......... B60N 2/6673; B60N 2002/0236; F16H 1/203; F16H 57/021; F16H 57/039; F16H 19/06; F16H 19/0645; F16H 55/22; F16H 57/02; F16H 2057/0213; F16H 2057/02034; F16H 2025/209; F16H 1/16; F16H 1/166; F16H 33/02; H02K 7/1166; H02K 7/06; H02K 7/081; A47C 7/465; E05B 81/06; E05B 81/28; E05B 81/34
USPC .................................................. 74/421 A, 425
See application file for complete search history.

(56) References Cited

U.S. PATENT DOCUMENTS

| | | | |
|---|---|---|---|
| 6,814,407 | B2 | 11/2004 | Mundell |
| 6,983,990 | B2 | 1/2006 | McMillen |

(Continued)

FOREIGN PATENT DOCUMENTS

| | | |
|---|---|---|
| CN | 1583439 A | 2/2005 |
| CN | 103973024 A | 8/2014 |

(Continued)

OTHER PUBLICATIONS

The National Intellectual Property Administration of China, First Office Action for related Chinese Application No. 201710158744.X, dated Oct. 23, 2018.

*Primary Examiner* — Victor L Macarthur
*Assistant Examiner* — Joseph Brown
(74) *Attorney, Agent, or Firm* — Brooks Kushman P.C.

(57) ABSTRACT

An actuator assembly having an actuator, a worm gear, a first gear unit, a second gear unit, and a biasing member. The actuator may rotate the worm gear, first gear unit, and second gear unit in first rotational directions while the biasing member may rotate the worm gear, first gear unit, and second gear unit in second rotational directions.

20 Claims, 8 Drawing Sheets

(56) References Cited

U.S. PATENT DOCUMENTS

| | | | | |
|---|---|---|---|---|
| 7,401,534 | B2* | 7/2008 | Shibata | F16H 1/22 |
| | | | | 74/425 |
| 8,011,269 | B2* | 9/2011 | Elliot | B60N 2/66 |
| | | | | 297/284.4 |
| 9,150,097 | B2* | 10/2015 | Boom | H02K 7/1166 |
| 9,249,892 | B2* | 2/2016 | Klippert | H02K 7/1166 |
| 9,551,875 | B2* | 1/2017 | Ogasawara | B60K 35/00 |
| 9,644,704 | B2* | 5/2017 | Weber | H02K 7/1166 |
| 2005/0115348 | A1* | 6/2005 | Fisher | E05B 81/25 |
| | | | | 74/425 |
| 2005/0205361 | A1* | 9/2005 | Fisher | E05B 81/14 |
| | | | | 74/425 |
| 2006/0191369 | A1 | 8/2006 | Cockerham et al. | |
| 2011/0308339 | A1* | 12/2011 | Lin | F16H 1/16 |
| | | | | 74/425 |
| 2014/0246892 | A1 | 9/2014 | Samain et al. | |
| 2014/0265991 | A1 | 9/2014 | Zhao et al. | |
| 2015/0337957 | A1* | 11/2015 | Cyren | F16H 61/32 |
| | | | | 74/473.12 |
| 2016/0116024 | A1* | 4/2016 | Reddmann | F16D 41/02 |
| | | | | 74/411.5 |
| 2016/0238106 | A1* | 8/2016 | Park | F16H 57/039 |
| 2016/0355104 | A1* | 12/2016 | Kim | B60N 2/0232 |

FOREIGN PATENT DOCUMENTS

| | | | | |
|---|---|---|---|---|
| CN | 104854382 A | 8/2015 | | |
| CN | 105304363 A | 2/2016 | | |
| CN | 106218460 A | 12/2016 | | |
| DE | 102014100934 A1 * | 7/2015 | | F16H 57/039 |

* cited by examiner

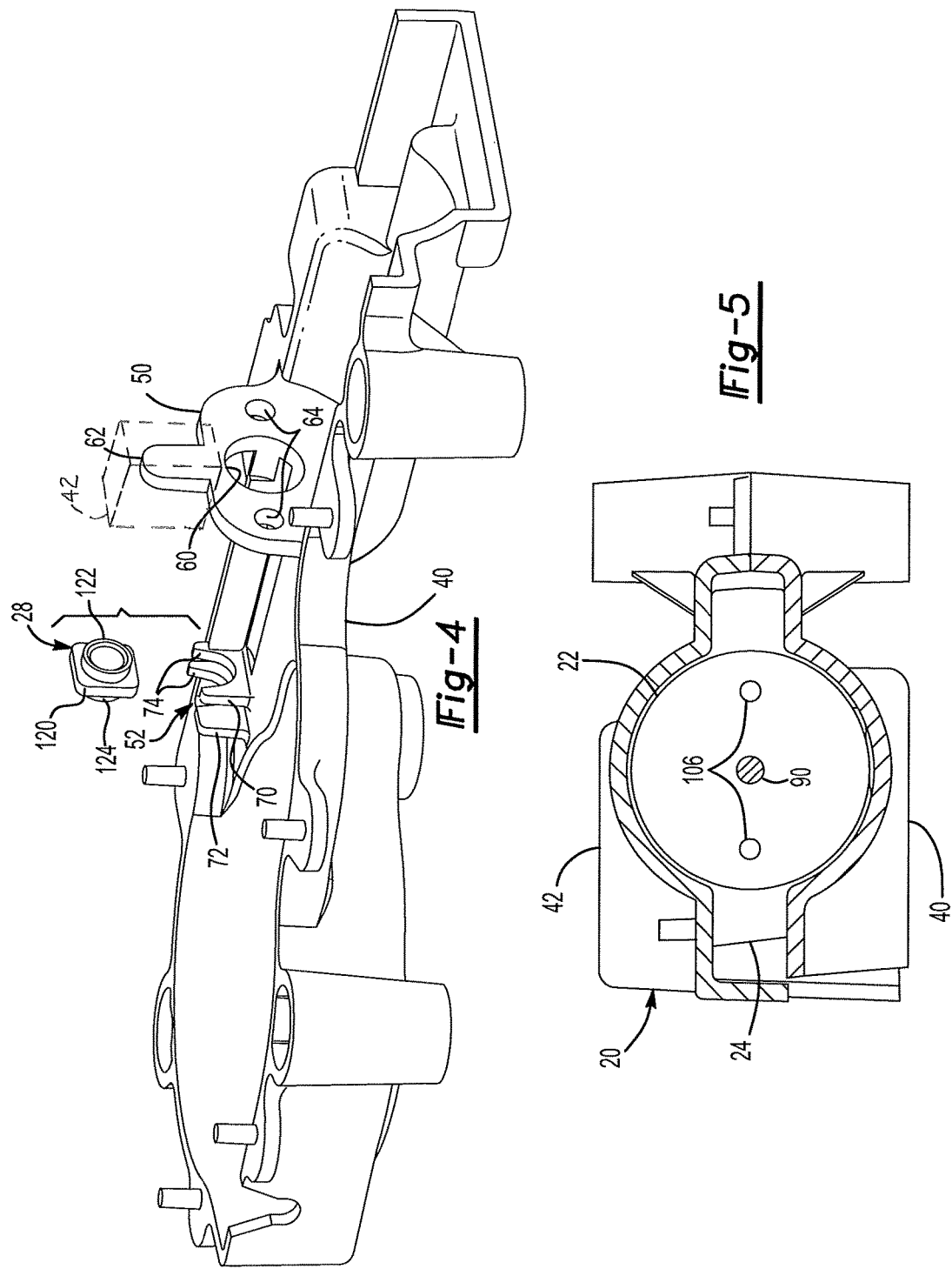

ACTUATOR ASSEMBLY

TECHNICAL FIELD

This disclosure relates to an actuator assembly that may actuate a linkage such as a cable.

BACKGROUND

A power actuator is disclosed in U.S. Pat. No. 6,983,990.

SUMMARY

In at least one embodiment, an actuator assembly is provided. The actuator assembly may include an actuator, a worm gear, a first gear unit, a second gear unit, and a biasing member. The worm gear may be rotated by the actuator. The first gear unit may have a pinion gear and a drive gear. The drive gear may engage the worm gear. The drive gear may have a pocket that may be disposed opposite the pinion gear. The second gear unit may have an output gear that may engage the pinion gear. The biasing member may be at least partially received in the pocket. The worm gear and the first gear unit may transmit torque from the actuator to rotate the second gear unit from a first position to a second position. The biasing member may actuate the second gear unit from the second position to the first position when torque is not provided by the actuator.

In at least one embodiment, an actuator assembly is provided. The actuator assembly may include a housing assembly, an actuator, a worm gear, a first gear unit, a biasing member, and a second gear unit. The actuator may be received in the housing assembly and may have an output shaft. The worm gear may be rotatable about a worm gear axis. The worm gear may be secured to the output shaft at a first end and may be supported by a bearing at a second end. The first gear unit may be rotatable about a first axis. The first gear unit may have a pinion gear and a drive gear that engages the worm gear. The biasing member may be disposed on the first gear unit. The second gear unit may be rotatable about a second axis and may have an output gear that engages the pinion gear. The actuator may rotate the worm gear, first gear unit, and second gear unit in first rotational directions about the worm gear axis, first axis, and second axis, respectively. The biasing member may rotate the worm gear, first gear unit, and second gear unit in second rotational directions about the worm gear axis, first axis, and second axis, respectively.

In at least one embodiment, an actuator assembly is provided. The actuator assembly may include a housing assembly, an actuator, a worm gear, a first gear unit, a biasing member, and a second gear unit. The housing assembly may have a mounting flange. The actuator may be received in the housing assembly and may have an output shaft. The actuator may be mounted to the mounting flange such that the actuator may be cantilevered from the mounting flange. The worm gear may be secured to the output shaft at a first end and may be supported by a bearing at a second end. The first gear unit may be rotatable about a first axis. The first gear unit may have a pinion gear and a drive gear that may engage the worm gear. The biasing member may be disposed on the first gear unit. The second gear unit may be rotatable about a second axis and may have an output gear that engages the pinion gear.

BRIEF DESCRIPTION OF THE DRAWINGS

FIG. 4 is a magnified perspective view of a portion of the actuator assembly showing a bearing, a bearing retainer, and a mounting flange.
FIG. 5 is a section view of the actuator assembly along section line 5-5.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
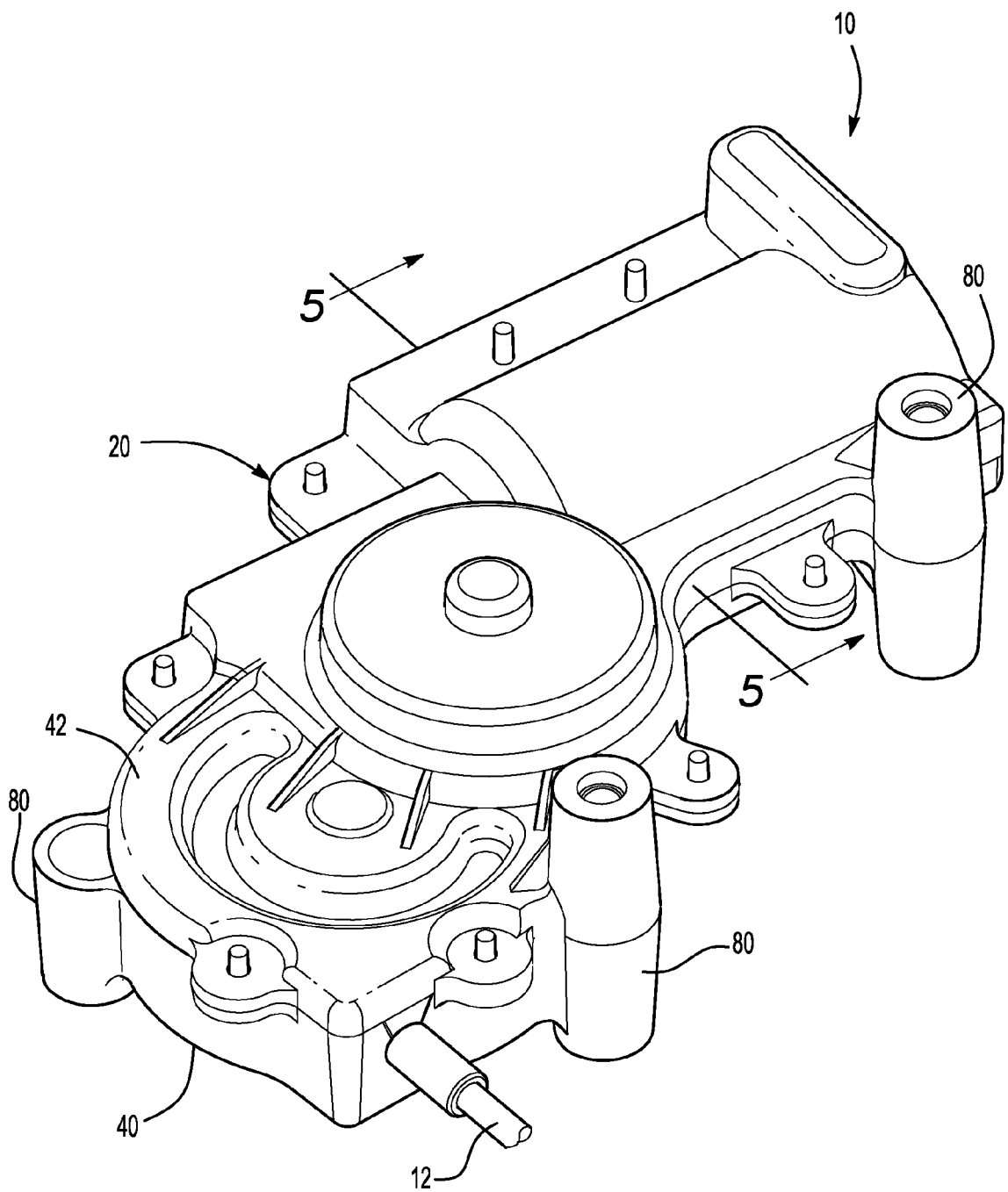
FIG. 1 is a perspective view of an actuator assembly.
Figure 2:
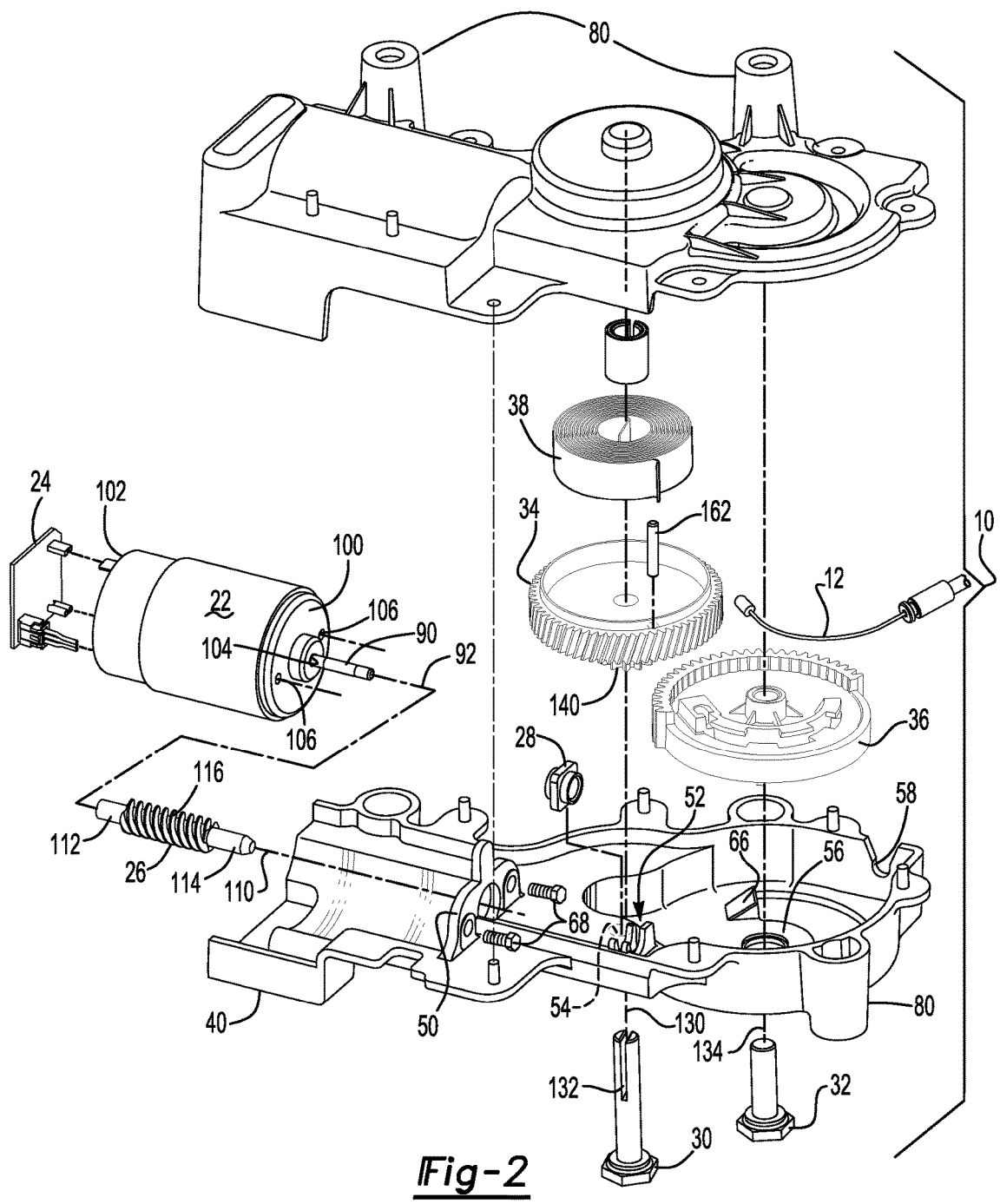
FIG. 2 is an exploded view of the actuator assembly.

Referring to FIGS. 1 and 2, an actuator assembly 10 is shown. The actuator assembly 10 may be configured to actuate a linkage 12, such as a cable. The actuator assembly 10 may include a housing assembly 20, an actuator 22, a circuit board 24, a worm gear 26, a bearing 28, a first shaft 30, a second shaft 32, a first gear unit 34, a second gear unit 36, and a biasing member 38.

The housing assembly 20 may receive and support components of the actuator assembly 10. For example, the housing assembly 20 may receive the actuator 22, circuit board 24, worm gear 26, bearing 28, first shaft 30, second shaft 32, first gear unit 34, second gear unit 36, and biasing member 38. In at least one configuration, the housing assembly 20 may include a base portion 40 and a cover portion 42.

Referring to FIG. 2, the base portion 40 may support various components of the actuator assembly 10. In at least one configuration, the base portion may have a mounting flange 50, a bearing retainer 52, a first shaft opening 54, a second shaft opening 56, and a linkage opening 58.

The mounting flange 50 may facilitate mounting of the actuator 22 to the housing assembly 20. The mounting flange 50 may be integrally formed with the base portion 40 and may extend from the base portion 40 to the cover portion 42 in one or more embodiments. In FIG. 2, the mounting flange 50 extends from the base portion 40; however, it is contemplated that the mounting flange 50 may be provided with the cover portion 42 in one or more embodiments. As is best shown in FIG. 4, the mounting flange 50 may have a hole 60, a tab 62, one or more fastener openings 64, and a stop block 66.

The hole 60 may extend through the mounting flange 50. The hole 60 may receive an output shaft of the actuator 22, the worm gear 26, or both.

The tab 62 may extend away from an exterior surface of the base portion 40 to the cover portion 42. The tab 62 may extend away from the hole 60 and may be received in a corresponding slot in the cover portion 42. As such, tab 62 may help align the base portion 40 and the cover portion 42 and may help inhibit flexing of the mounting flange 50. In addition, the tab 62 may engage the actuator 22 to help inhibit movement or vibration of the actuator 22.

The fastener opening 64 may receive a fastener 68 (best shown in FIG. 2), such as a threaded fastener like a screw, that may couple the actuator 22 to the mounting flange 50. In FIG. 4, a pair of fastener openings 64 are shown that are disposed on opposite sides of the hole 60.

The bearing retainer 52 may receive and position the bearing 28. The bearing retainer 52 may be integrally formed with a portion of the housing assembly 20, such as the base portion 40, and may be spaced apart from the mounting flange 50. The bearing retainer 52 may include a first wall 70 and a second wall 72. The first wall 70 may be disposed substantially parallel to the second wall 72 and may be spaced apart from the second wall 72. The first wall 70 and the second wall 72 may have substantially similar or identical configurations. For example, the first wall 70 and the second wall 72 may each have an opening 74. The opening 74 in the first wall 70 may be referred to as a first opening. The opening 74 in the second wall 72 may be referred to as a second opening. Each opening 74 may be configured as an open sided slot that may face toward the cover portion 42. The opening 74 may have a curved or arcuate surface that may receive and support the bearing 28 as will be described in more detail below.

Figure 3:
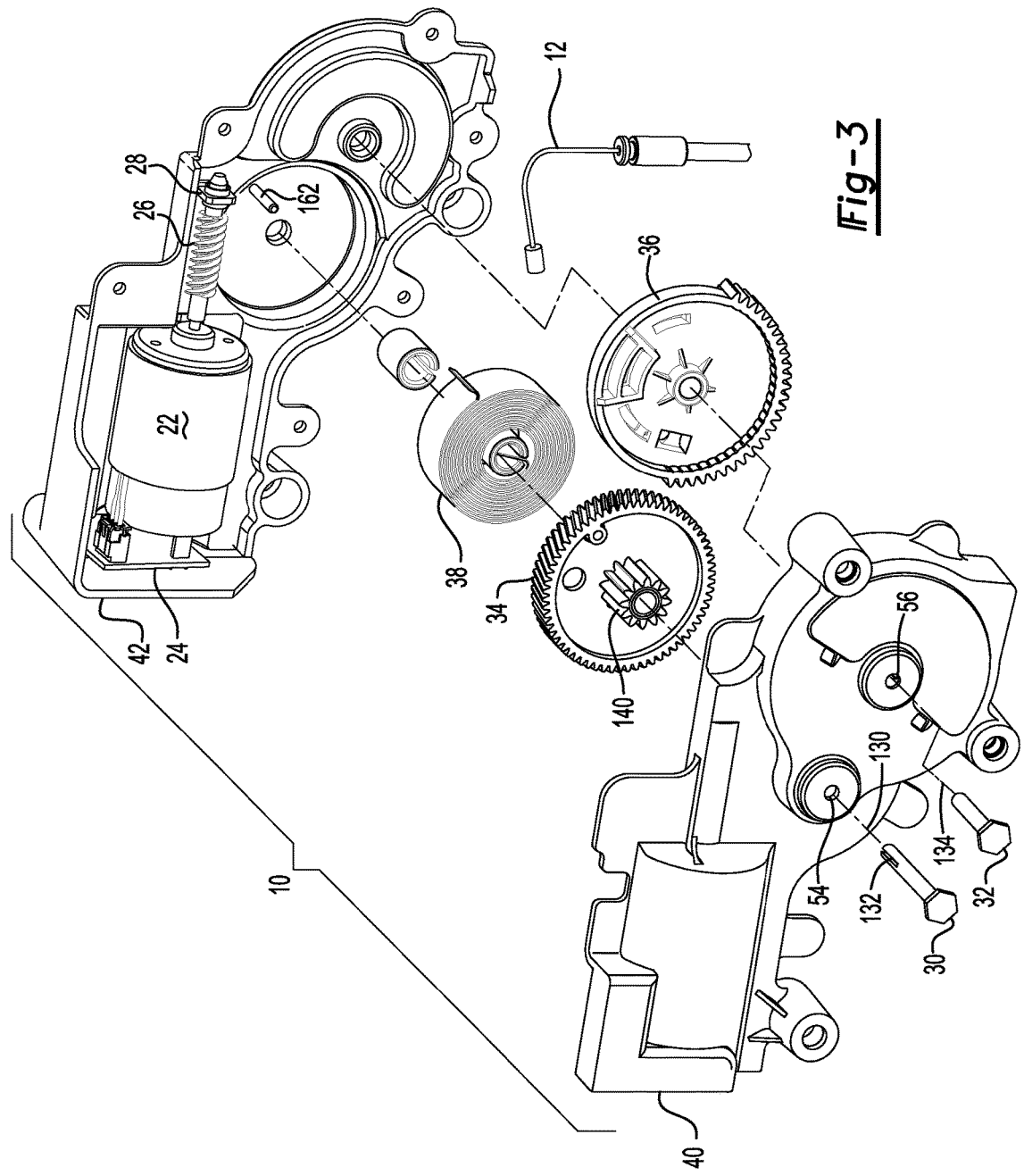
FIG. 3 is a partially exploded view of the actuator assembly.

Referring to FIGS. 2 and 3, the first shaft opening 54 may receive the first shaft 30. For example, the first shaft opening 54 may receive the first shaft 30 such that the first shaft 30 may not rotate with respect to the housing assembly 20. For instance, a portion of the first shaft 30 may be insert molded within the base portion 40 such that the first shaft 30 is fixedly disposed on the base portion 40.

The second shaft opening 56 may be spaced apart from the first shaft opening 54. The second shaft opening 56 may receive the second shaft 32. For example, the second shaft opening 56 may receive the second shaft 32 such that the second shaft 32 may not rotate with respect to the housing assembly 20. For instance, a portion of the second shaft 32 may be insert molded within the base portion 40 such that the second shaft 32 is fixedly disposed on the base portion 40.

The linkage opening 58 may allow the linkage 12 to extend through the housing assembly 20. The linkage opening 58 may be provided with the base portion 40, the cover portion 42, or both. The location of the linkage opening 58 may vary from the position shown to meet packaging requirements.

Referring to FIG. 2, the stop block 66 may limit or stop rotation of the second gear unit 36 about its axis. The stop block 66 may be disposed on an internal surface of the base portion 40 and may extend toward the second gear unit 36. The stop block 66 may have any suitable configuration and may be integrally formed with the base portion 40 or may be provided as a separate component that may be coupled to the base portion 40. The stop block 66 may also include a bumper that may cushion the second gear unit 36 and reduce noise during operation.

Referring to FIGS. 2 and 3, the cover portion 42 may generally be disposed opposite the base portion 40. The cover portion 42 may cooperate with the base portion 40 define a cavity that receives components of the actuator assembly 10. The base portion 40 and the cover portion 42 may also have all cooperate to find one or more mounting bosses 80 that may facilitate mounting of the actuator assembly 10 to another component. In a vehicular application, the actuator assembly 10 may be mounted to a frame of a seat assembly or a vehicle body structure. The cover portion 42 may be attached to the base portion 40 in any suitable manner, such with one or more fasteners, an adhesive, heat staking, or thermal bonding.

Referring to FIG. 2, the actuator 22 may provide torque to rotate the worm gear 26. The actuator 22 may be of any suitable type, such as an electric motor like a direct current motor. The actuator 22 may be configured or controlled in a manner that provides torque to rotate the worm gear 26 in one rotational direction. For example, the actuator 22 may have an output shaft 90 and may be configured to provide torque that rotates the output shaft 90 about an output shaft axis 92 in one rotational direction when electrical current is provided to the actuator 22. Conversely, the actuator 22 may not provide torque to the output shaft 90 when current is not provided to the actuator 22.

The actuator 22 may include an actuator housing that may receive components of the actuator 22. The actuator housing may have a first end wall 100 and a second end wall 102.

The first end wall 100 may be mounted on and may engage the mounting flange 50. For instance, the first end wall 100 may have a hole 104 through which the output shaft 90 may extend and may have one or more fastener holes 106 that may receive a corresponding fastener 68.

The second end wall 102 may be disposed opposite the first end wall 100. The second end wall 102 may facilitate connection to the circuit board 24 or mounting of the circuit board 24 to the actuator 22.

Referring to FIG. 5, the actuator 22 may be mounted to the mounting flange 50 such that the actuator 22 is cantilevered from the mounting flange 50. As such, the actuator housing may be spaced apart from and may not engage the housing assembly 20 remotely from the first end wall 100. Moreover, the actuator 22 may be spaced apart from and may not engage the cover portion 42. Mounting the actuator 22 in a cantilevered manner may inhibit rattling or noise that may otherwise be transmitted from the actuator 22 to the housing assembly 20.

Referring to FIG. 2, the circuit board 24 may control operation of the actuator 22. In at least one embodiment, the circuit board 24 may be received in the housing assembly 20 and may not engage the housing assembly 20. For instance, the circuit board 24 may be disposed on the second end wall 102 of the actuator 22 and may be spaced apart from the base portion 40 and the cover portion 42 to inhibit rattling or noise that may otherwise be transmitted from the actuator 22 to the housing assembly 20.

The worm gear 26 may operatively connect the actuator 22 to the first gear unit 34. The worm gear 26 may extend along a worm gear axis 110 that may be coaxially disposed with the output shaft axis 92. In at least one configuration, the worm gear 26 may include a first end 112, a second end 114, and a set of worm gear teeth 116.

The first end 112 may be coupled to the actuator 22. For instance, the first end 112 may be disposed on the output shaft 90. The first end 112 may be secured to the output shaft 90 in any suitable manner, such as by press fitting.

The second end 114 may be disposed opposite the first end 112. The second end 114 may be supported by the bearing 28.

The worm gear teeth 116 may be disposed between the first end 112 and the second end 114. The worm gear teeth 116 may engage teeth of a drive gear of the first gear unit 34.

Referring to FIGS. 2 and 4, the bearing 28 is configured to support the second end 114 of the worm gear 26. The bearing 28 may be received in the bearing retainer 52. The bearing 28 may have a body 120, the first hub 122, and a second hub 124. The body 120 may be received between the first wall 70 and the second wall 72 of the bearing retainer 52 and may have a hole through which the second end 114 of the worm gear 26 may extend. The first hub 122 and the second hub 124 may extend in opposite directions from the body 120. The first hub 122 and the second hub 124 may be substantially cylindrical and may each have a hole through which the second end 114 of the worm gear 26 may extend. The first hub 122 may be received in the opening 74 of the first wall 70. The second hub 124 may be received in the opening 74 of the second wall 72. As such, the first wall 70 and the second wall 72 may support the bearing 28 and inhibit axial movement of the bearing 28 or movement along the worm gear axis 110. The cover portion 42 may engage the first hub 122 and/or the second hub 124. As such, the cover portion 42 may help secure the bearing and inhibit removal of the bearing 28 from the bearing retainer 52 when the cover portion 42 is disposed on the base portion 40.

Referring to FIGS. 2 and 3, the first shaft 30 may rotatably support the first gear unit 34. In at least one embodiment, the first shaft 30 may engage the first gear unit 34 without providing a separate bushing between the first shaft 30 and the first gear unit 34. The first shaft 30 may extend along a first axis 130 from the base portion 40 toward the cover portion 42 of the housing assembly 20. The first shaft 30 may be received in the first shaft opening 54 and may be fixedly disposed on the base portion 40. As such, the first shaft 30 may not rotate about the first axis 130 or move along the first axis 130. The first shaft 30 may include a slot 132 that may be coupled to the biasing member 38 or may receive an end of the biasing member 38. The slot 132 may be disposed proximate and end of the first shaft 30 and may extend from an end of the first shaft 30 that may be disposed adjacent to the cover portion 42. The slot 132 may extend along the first axis 130 and may extend radially through the first shaft 30.

The second shaft 32 may rotatably support the second gear unit 36. In at least one embodiment, the second shaft 32 may engage the second gear unit 36 without providing a separate bushing between the second shaft 32 and the second gear unit 36. The second shaft 32 may extend along a second axis 134 from the base portion 40 toward the cover portion 42. The second shaft 32 may be received in the second shaft opening 56 and may be fixedly disposed on the base portion 40. As such, the second shaft 32 may not rotate about the second axis 134 or move along the second axis 134.

Referring to FIG. 2, the first gear unit 34 may be rotatably disposed on the first shaft 30 and may be rotatable about the first axis 130. In addition, the first gear unit 34 may transmit torque from the worm gear 26 to the second gear unit 36. As is best shown in FIGS. 6 and 7, the first gear unit 34 may include a pinion gear 140 and a drive gear 142.

Figure 7:
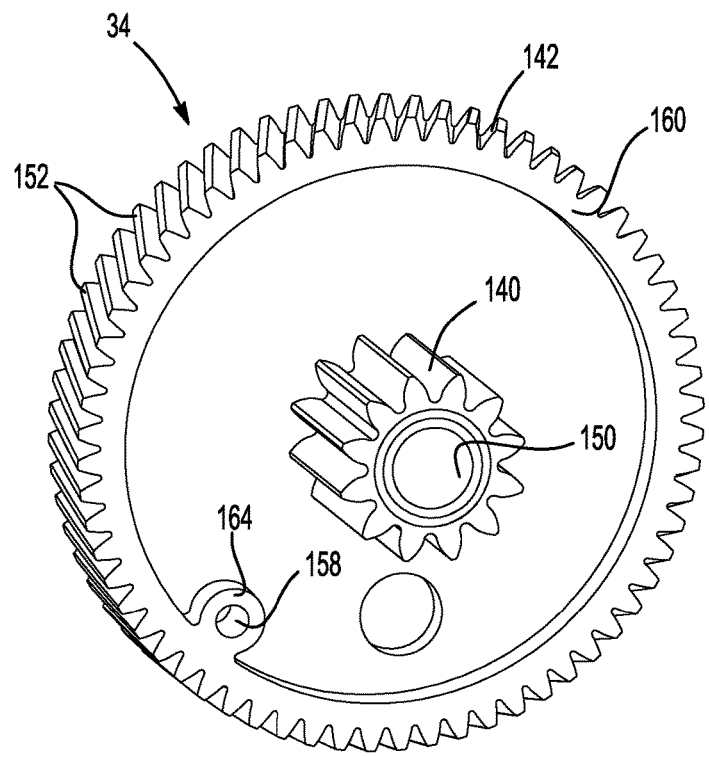

Referring to FIG. 7, the pinion gear 140 may extend from the drive gear 142 toward the base portion 40 of the housing assembly 20. The pinion gear 140 may be disposed along the first axis 130 and may have a set of teeth that may be arranged around the first axis 130 and that may engage teeth on the second gear unit 36. The pinion gear 140 may be integrally formed with the drive gear 142. In addition, the pinion gear 140 may have a smaller diameter than the drive gear 142.

Figure 6:
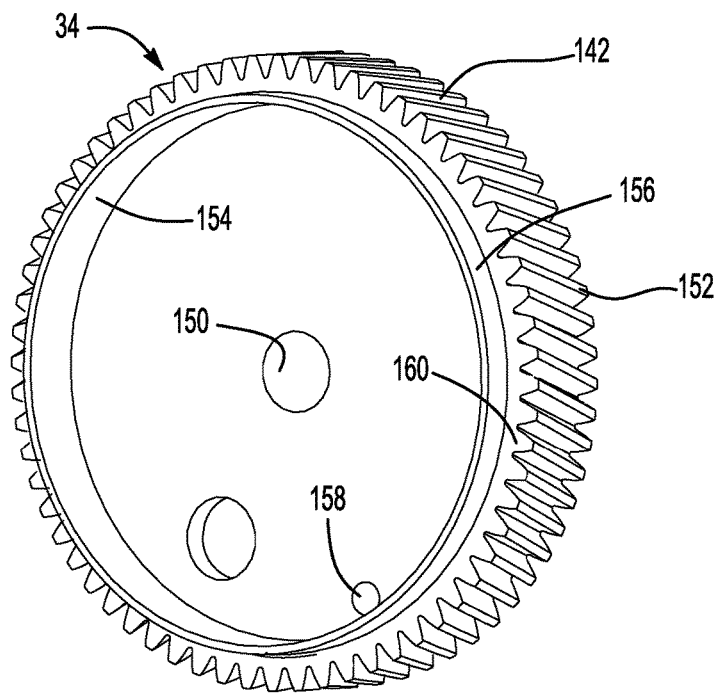
FIGS. 6 and 7 are perspective views of a first gear unit.

Referring to FIGS. 6 and 7, the drive gear 142 may be disposed adjacent to the pinion gear 140. The drive gear 142 may be disposed along the first axis 130 and may have a center hole 150, a set of teeth 152, a pocket 154, a rim 156, and a pin mount 158.

The center hole 150 may receive the first shaft 30. The center hole 150 may be disposed along the first axis 130.

The set of teeth 152 may be arranged around the first axis 130 and may engage the worm gear teeth 116. The set of teeth 152 may be disposed further from the first axis 130 than the set of teeth of the pinion gear 140. The set of teeth 152 may be at least partially defined by a pair of lateral sides 160. The lateral sides 160 may be disposed substantially parallel to each other and may be is disposed substantially perpendicular to the first axis 130. The lateral side 160 that faces toward the cover portion 42 may extend from the rim 156 in a direction that extends away from the first axis 130.

The pocket 154 may receive the biasing member 38. The pocket 154 may be disposed opposite the pinion gear 140 and may face toward the cover portion 42. The pocket 154 may extend into the first gear unit 34 such that the set of teeth 152 are arranged around at least a portion of the pocket 154.

The rim 156 may extend from the set of teeth 152 toward the cover portion 42. As such, the rim 156 may extend away from the pinion gear 140. The rim 156 may be configured as a ring that may be radially disposed about the first axis 130. Moreover, the rim 156 may extend away from a lateral side 160 that defines a side of the set of teeth 152. The rim 156 may be disposed closer to the first axis 130 than the set of teeth 152 and may at least partially define the pocket 154.

The pin mount 158 may be coupled to a pin 162 that may be connected to the biasing member 38. In at least one embodiment, the pin mount 158 may be configured as a hole that may receive the pin 162. The pin 162 may be fixedly coupled to the pin mount 158 in any suitable manner, such as by press fitting. As is best shown in FIG. 7, the pin mount 158 may include a reinforcement boss 164 that may be disposed on a side of the drive gear 142 that faces toward the base portion 40. The reinforcement boss 164 may extend from the set of teeth 152 toward the pinion gear 140. The pin 162 may be at least partially received in the pocket 154 and may extend from the drive gear 142 toward the cover portion 42.

Figure 8:
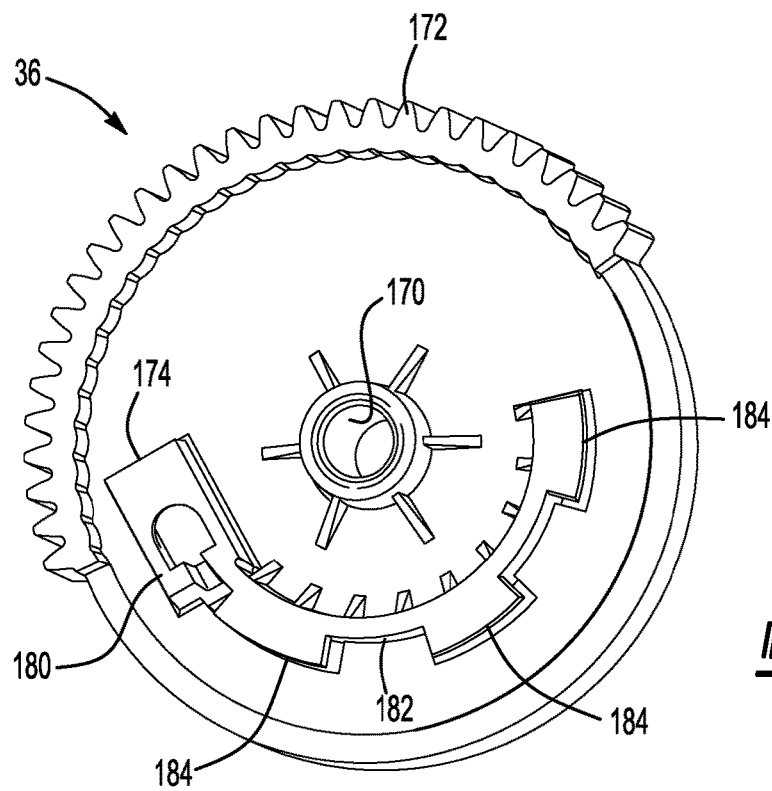
FIGS. 8 and 9 are perspective views of a second gear unit.
Figure 9:
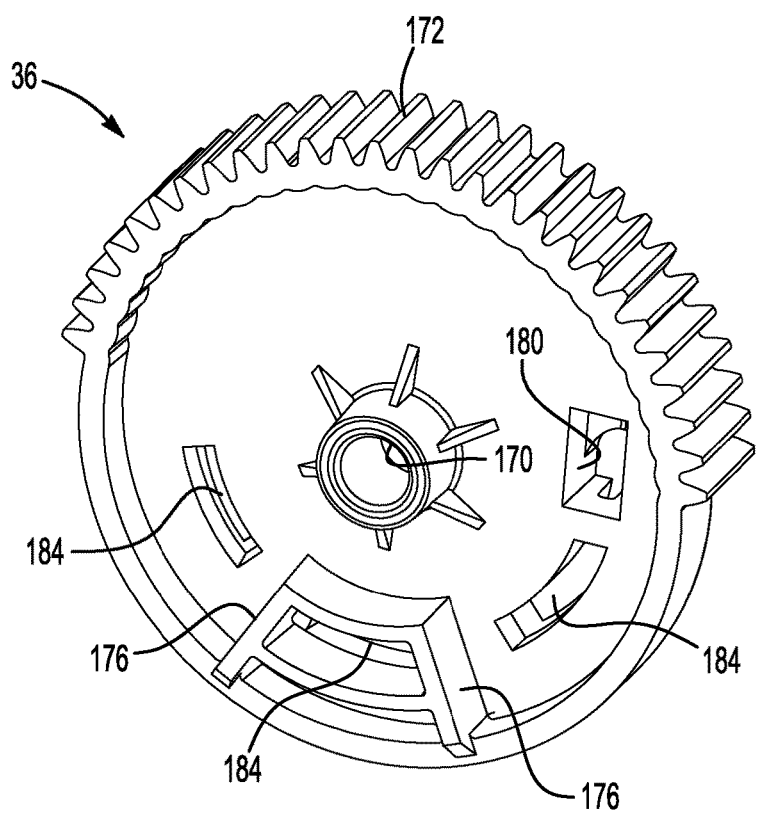

Referring to FIG. 2, the second gear unit 36 may be rotatably disposed on the second shaft 32 and may be rotatable about the second axis 134. As is best shown in FIGS. 8 and 9, the second gear unit 36 may include a center hole 170, an output gear 172, a linkage retainer 174, and a stop 176.

The center hole 170 may receive the second shaft 32. The center hole 170 may be disposed along the second axis 134.

The output gear 172 may have a set of teeth that may be arranged around the second axis 134 and may engage the pinion gear 140 of the first gear unit 34. The output gear 172 may be configured as a sector gear that may extend partially around the second axis 134. In FIGS. 8 and 9, the output gear 172 extends approximately 170° around the second axis 134.

The linkage retainer 174 may be configured to receive and guide the linkage 12. The linkage retainer 174 may be disposed on a side of the second gear unit 36 that faces toward the cover portion 42. In at least one embodiment, the linkage retainer 174 may include a mounting block 180, and arcuate wall 182.

The mounting block 180 may be configured to receive an end of the linkage 12. For example, the mounting block 180 may have a slot that may extend from an enlarged opening. An enlarged end of the linkage 12 may be inserted through the enlarged opening and a smaller portion of the linkage, such as a cable wire, may extend through the slot toward the arcuate wall 182.

The arcuate wall 182 may extend along an arc from the mounting block 180. The arcuate wall 182 may be radially disposed with respect to the second axis 134. The linkage 12 may extend along the arcuate wall 182 to help guide the linkage 12 as the second gear unit 36 rotates about the second axis 134. The arcuate wall 182 may extend partially around the second axis 134. In FIGS. 8 and 9, the arcuate wall extends approximately 160° around the second axis 134. The arcuate wall 182 may have a plurality of retention tabs 184. The retention tabs 184 may extend from a distal end of the arcuate wall 182 in a direction that extends away from the second axis 134 and the output gear 172. The retention tabs 184 may help secure the linkage 12 and may limit movement of the linkage 12 toward the cover portion 42, thereby inhibiting the linkage 12 from moving over the arcuate wall 182.

Referring to FIG. 9, the stop 176 may limit rotation of the second gear unit 36 about the second axis 134. The stop 176 may extend toward the base portion 40 and may extend from a circumference of the second gear unit 36 toward the second axis 134. Optionally, bumpers may be provided on the radial side walls of the stop 176 to act as a cushion that may help slow rotation of the second gear unit 36.

Referring to FIGS. 2 and 3, the biasing member 38 may be disposed on the first gear unit 34. For example, the biasing member 38 may be at least partially received in the pocket 154 and may be spaced apart from the rim 156. The biasing member 38 may exert a biasing force on the first gear unit 34 that may backdrive the first gear unit 34. As such, the biasing member 38 may rotate the first gear unit 34 about the first axis 130 in the opposite direction from the direction that torque provided by the actuator 22 rotates the first gear unit 34. The biasing member 38 may have any suitable configuration. For example, the biasing member 38 may be configured as a spring. In FIGS. 2 and 3, the biasing member 38 is depicted as a spiral spring that has a first end and a second end. The first end may be received in the slot 132 of the first shaft 30. The second end may be disposed opposite the first end and may engage the pin 162 or be operatively connected to the pin 162. The biasing member 38 may have a substantially constant spring rate in one or more embodiments. Providing the biasing member 38 with the first gear unit 34 instead of the second gear unit 36 may be more efficient, may reduce stress on the gear teeth of the second gear unit 36, which in turn may allow a lighter second gear unit 36 to be provided with less gear teeth stiffness, and may allow a biasing member to be configured to provide less torque.

Figure 10:
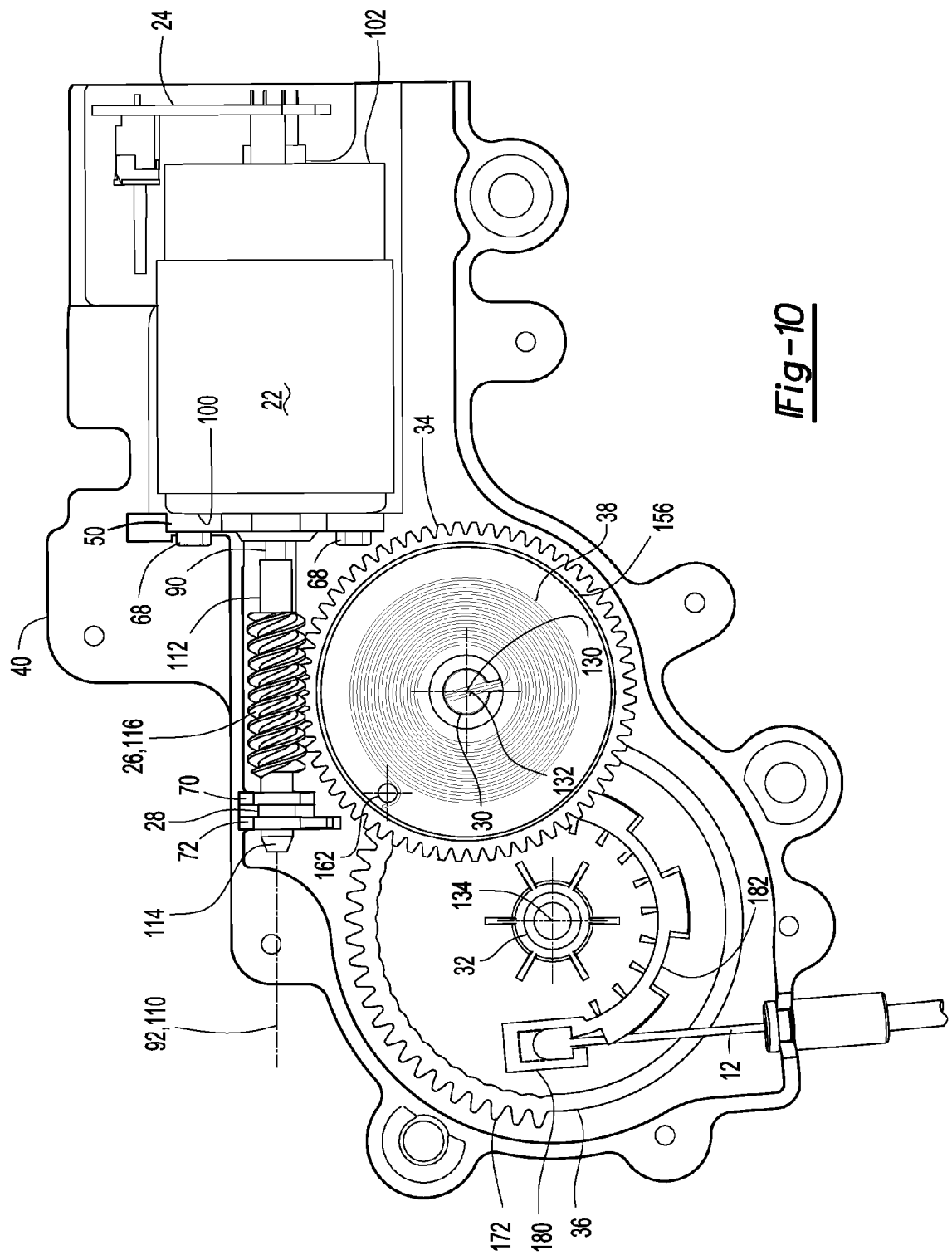
FIG. 10 is a plan view of the actuator assembly in an initial position.
Figure 11:
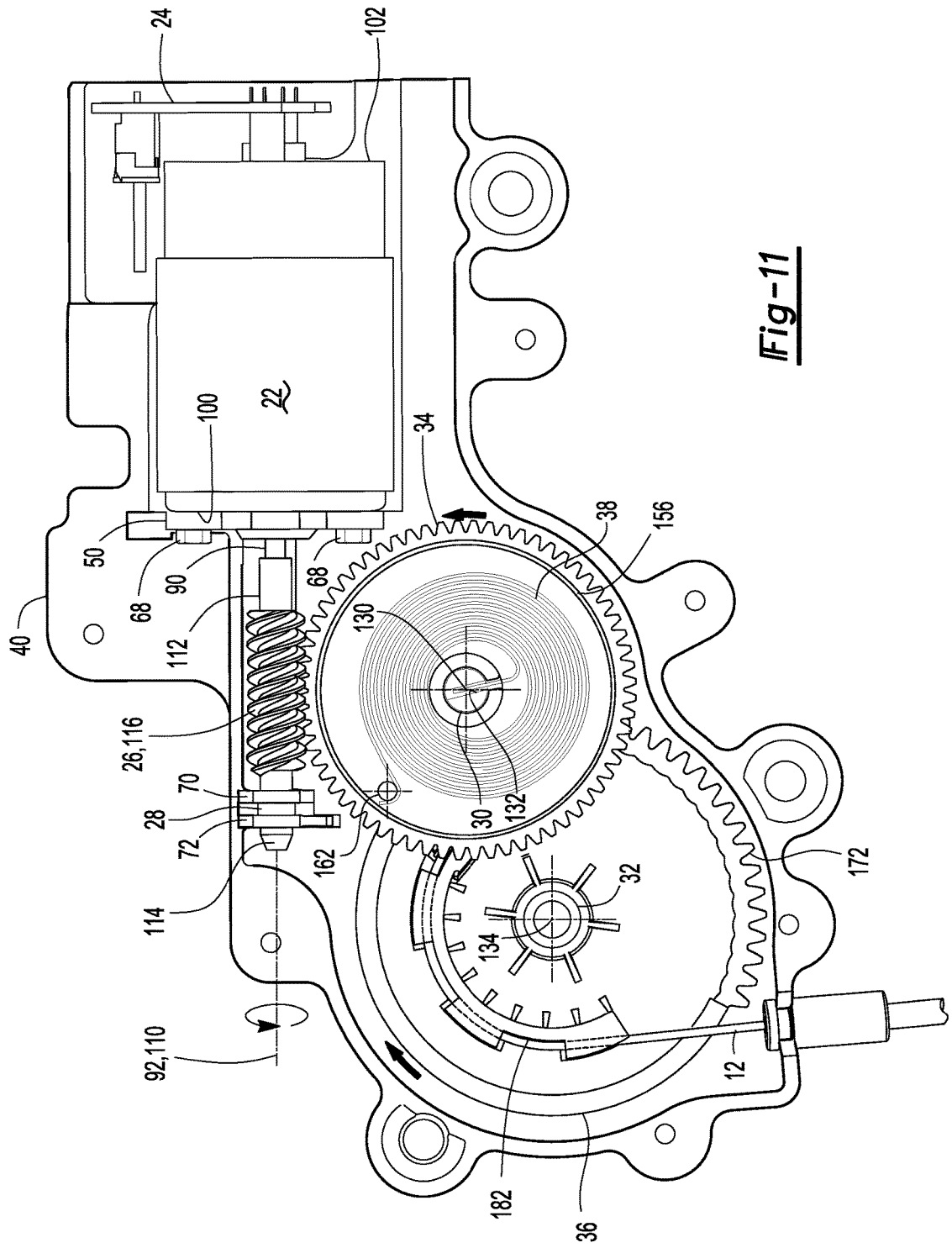
FIG. 11 is a plan view of the actuator assembly in a retracted position.

Referring to FIGS. 10 and 11, operation of the actuator assembly 10 is depicted. FIG. 10 shows the actuator assembly 10 in an initial position while FIG. 11 shows the actuator assembly 10 in a retracted position or actuated position in which the linkage 12 is retracted or pulled by the actuator assembly 10.

In FIG. 10, the actuator assembly 10 is shown in the initial position, such as when the actuator 22 does not receive current to provide torque to rotate the worm gear 26 about the worm gear axis 110. The biasing member 38 may hold the worm gear 26, first gear unit 34, and the second gear unit 36 in stationary initial positions or first positions such as is shown.

In FIG. 11, the actuator 22 provides torque that rotates the worm gear 26 in a first direction about the worm gear axis 110 (such as a counterclockwise direction from a perspective looking along the worm gear axis 110 from the end of the worm gear 26 toward the actuator 22) as represented by the arrowed line disposed about the worm gear axis 110. The worm gear 26 then transmits torque to the first gear unit 34 and rotates the first gear unit 34 in a first direction about the first axis 130 (such as in a counterclockwise direction from the perspective shown) as represented by the curved arrow line located adjacent to the first gear unit 34. In FIG. 11, the first gear unit 34 appears to be in approximately the same position as is shown in FIG. 10, but has rotated about two revolutions (720°) about the first axis 130. It is contemplated that the first gear unit 34 may rotate a different angular distance about the first axis 130 depending on various parameters, such as the gear ratio between the worm gear 26 and the pinion gear 140. The first gear unit 34 then transmits torque to the second gear unit 36 and rotates the second gear unit 36 in a first direction about the second axis 134 (such as in a clockwise direction from the perspective shown) as represented by the curved arrow line located adjacent to the second gear unit 36. Rotation of the second gear unit 36 in the first direction pulls the linkage 12 and winds the linkage 12 upon the arcuate wall 182 of the linkage retainer 174. Rotation of the worm gear 26, first gear unit 34, and second gear unit 36 may stop when the stop 176 engages the stop block 66 on the housing assembly 20.

The linkage 12 may be connected to any suitable component. For example, in a seat application, the linkage 12 may be connected to a lumbar mechanism, a seat track, a recliner mechanism, a seat bottom height adjuster, or a latch. In other applications, the linkage 12 may be connected to a latch or any other component that may be actuated by a linkage 12.

The actuator assembly 10 may move from the retracted position shown in FIG. 11 back to the initial position shown in FIG. 10 when the actuator 22 does not provide sufficient torque to overcome the biasing force of the biasing member 38, such as when current is not provided to an actuator 22 configured as an electric motor. The worm gear 26, first gear unit 34, and second gear unit 36 may then rotate in second directions about their respective axes back to the positions shown in FIG. 10. For instance, the biasing force exerted by the biasing member 38 may cause the first gear unit 34 to rotate in a second direction about the first axis 130, such as a clockwise direction, from its second position back to its first position. The rotation of the first gear unit 34 back toward its first position may cause the second gear unit 36 to rotate in a second direction about the second axis 134, such as in a counterclockwise direction, from its second position back toward its first position and may cause the worm gear 26 to rotate in a second direction about the worm gear axis 110, such as a clockwise direction, from its second position back toward its first position. As such, the actuator 22 may not actuate the worm gear 26, first gear unit 34, and second gear unit 36 from their second positions to their respective first positions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An actuator assembly comprising:
   an actuator;
   a worm gear that is rotated by the actuator;
   a first gear unit that is rotatable about a first axis and has
      a pinion gear and a drive gear that engages the worm
      gear, wherein the drive gear has a pocket and the pinion
      gear is disposed on an opposite side of the drive gear
      from the pocket;

a second gear unit that is rotatable about a second axis and has an output gear that engages the pinion gear, wherein the second gear unit has a linkage retainer that has a mounting block that receives an end of a linkage, au arcuate wall that is spaced apart from an outside circumference of the second gear unit and radially disposed with respect to the second axis, and a plurality of retention tabs that are spaced apart from each other and from the mounting block and extend from a distal end of the arcuate wall in a direction that extends away from the second axis, wherein the linkage is disposed on the arcuate wall, and a stop that limits rotation of the second gear unit about the second axis, wherein the stop extends from the outside circumference of the second gear unit and is disposed on an opposite side of the second gear unit from the arcuate wall; and a biasing member that is only partially received in the pocket, wherein the worm gear and first gear unit transmit torque from the actuator to rotate the second gear unit from a first position to a second position and the biasing member actuates the second gear unit from the second position to the first position.

2. The actuator assembly of claim 1 wherein the actuator is an electric motor and does not actuate the second gear unit from the second position to the first position.

3. The actuator assembly of claim 1 wherein the drive gear has a set of teeth that are arranged around the pocket.

4. The actuator assembly of claim 3 wherein the drive gear has a rim that is radially disposed about the first axis and that extends away from the pinion gear, wherein the rim at least partially defines the pocket.

5. The actuator assembly of claim 4 wherein the rim extends away from a lateral side that defines a side of the set of teeth.

6. The actuator assembly of claim 1 wherein the first gear unit rotates about a first shaft that has a slot that receives a first end of the biasing member.

7. The actuator assembly of claim 6 wherein the biasing member has a second end that is disposed opposite the first end and that engages a pin that extends from the drive gear.

8. The actuator assembly of claim 7 wherein the pin is at least partially disposed in the pocket and the slot is disposed along the first axis.

9. An actuator assembly comprising:
a housing assembly;
an actuator that is received in the housing assembly and that has an output shaft;
a worm gear that is rotatable about a worm gear axis and is secured to the output shaft for rotation therewith;
a first gear unit that is rotatable about a first axis and that has a pinion gear, a drive gear that engages the worm gear, the drive gear including a set of teeth that are arranged around the first axis, a rim that extends continuously around the first axis and partially defines a pocket, wherein the rim is disposed outside of the pocket, extends away, from a lateral side of the drive gear that is disposed outside of the pocket, and faces away from the pinion gear in an axial direction that extends away from the pinion gear, and a pin mount that includes a through hole that receives a pin and a reinforcement boss that extends continuously around the through hole and is disposed on a side of the drive gear that laces away from the pocket and that extends from the set of teeth toward the pinion gear;
a biasing member that has an end that engages the pin and is disposed on the first gear unit such that a portion of the biasing member extends in the axial direction past the rim and is disposed outside of the pocket; and
a second gear unit is rotatable about a second axis and that has an output gear that engages the pinion gear;
wherein the actuator rotates the worm gear, first gear unit, and second gear unit in first directions about the worm gear axis, first axis, and second axis, respectively, and the biasing member rotates the worm gear, first gear unit, and second gear unit in second directions about the worm gear axis, first axis, and second axis, respectively.

10. The actuator assembly of claim 9 wherein the housing assembly receives the first gear unit, second gear unit, and the biasing member.

11. The actuator assembly of claim 9 wherein the worm gear has a first end that is disposed on the output shaft and a second end that is disposed opposite the first end, and the housing assembly has a hearing retainer that receives a bearing that supports the second end of the worm gear, wherein the bearing retainer has a first wall and a second wall that are spaced apart from each other and the bearing is disposed between and supported by the first wall and the second wall.

12. The actuator assembly of claim 11 wherein the first wall has a first opening, the second wall has a second opening, and the bearing has a body and first and second hubs that extend from the body, wherein the body is disposed between the first wall and the second wall, the first hub is received in the first opening, and the second hub is received in the second opening.

13. The actuator assembly of claim 9 wherein the second gear unit has a linkage retainer that has a mounting block that receives an end of a linkage and an arcuate wall that is radially disposed with respect to the second axis, wherein the linkage is disposed on the arcuate wall.

14. The actuator assembly of claim 13 wherein the linkage is a cable and the arcuate wall has a plurality of retention labs that retain the linkage and extend away from the second axis.

15. The actuator assembly of claim 14 wherein the output gear is a sector gear and the plurality of retention tabs extend away from the sector gear.

16. The actuator assembly of claim 9 wherein the housing assembly has a mounting flange and an actuator housing is mounted to the mounting flange such that the actuator housing is cantilevered inside the housing assembly from the mounting flange.

17. The actuator assembly of claim 16 wherein the actuator has a first end wall through which the output shaft extends, wherein the first end wall is mounted on the mounting flange.

18. The actuator assembly of claim 17 wherein the mounting flange has a hole through which the output shaft extends.

19. The actuator assembly of claim 17 wherein the actuator has a second end wall disposed opposite the first end wall and a circuit board that is disposed on the second end wall, wherein the circuit board does not engage the housing assembly.

20. The actuator assembly of claim 16 wherein the housing assembly has a base portion and a cover portion, wherein the mounting flange is disposed on the base portion and extends toward the cover portion and has a tab that engages the actuator and the cover portion.

* * * * *

UNITED STATES PATENT AND TRADEMARK OFFICE
CERTIFICATE OF CORRECTION

PATENT NO.         : 10,352,399 B2
APPLICATION NO.    : 15/141172
DATED              : July 16, 2019
INVENTOR(S)        : Curtis Hudson et al.

It is certified that error appears in the above-identified patent and that said Letters Patent is hereby corrected as shown below:

In the Claims

Column 9, Line 4, Claim 1:
After "receives an end of a linkage,"
Delete "au" and
Insert -- an --

Column 9, Line 63, Claim 9:
After "side of the drive gear that"
Delete "laces" and
Insert -- faces --

Column 10, Line 38, Claim 14:
After "a plurality of retention"
Delete "labs" and
Insert -- tabs --

Signed and Sealed this
Eleventh Day of February, 2020

Andrei Iancu
*Director of the United States Patent and Trademark Office*